United States Patent [19]

Elmer

[11] 4,246,716
[45] Jan. 27, 1981

[54] ICE FISHING APPARATUS

[76] Inventor: James W. Elmer, 13861 - 129th Avenue North, Anoka, Minn. 55303

[21] Appl. No.: 17,382

[22] Filed: Mar. 5, 1979

[51] Int. Cl.³ ............................................ A01K 97/12
[52] U.S. Cl. ....................................................... 43/17
[58] Field of Search ...................... 43/16, 17; 335/205, 335/207; 340/546, 547, 548, 551

[56] References Cited

U.S. PATENT DOCUMENTS

| | | | |
|---|---|---|---|
| 1,965,946 | 7/1934 | Pincus | 340/546 |
| 2,799,962 | 7/1957 | Mogren | 43/17 |
| 2,986,835 | 6/1961 | Ordinetz | 43/17 |
| 3,196,570 | 7/1965 | Borisch | 43/17 |
| 3,226,506 | 12/1965 | Angrisani | 335/205 |
| 3,359,673 | 12/1967 | Roemer | 43/17 |
| 3,378,945 | 4/1968 | Johnson | 43/17 |
| 3,770,919 | 11/1973 | Lewis | 335/205 |
| 3,913,255 | 10/1975 | Fillmen | 43/17 |

*Primary Examiner*—Nicholas P. Godici
*Assistant Examiner*—K. Bradford Adolphson
*Attorney, Agent, or Firm*—Kinney, Lange, Braddock, Westman and Fairbairn

[57] ABSTRACT

An ice fishing device provides an indication of the presence of a fish on the line. A magnetically actuated switch and a magnet are positioned in close proximity. A metal tab is connected to the fish line and is inserted between the magnet and the magnetically actuated switch. When in its inserted position, the metal tab shields the magnetically actuated switch from the magnetic field produced by the magnet. When sufficient force is applied to the fish line, the metal tab is pulled out of its inserted position. This causes the magnetically actuated switch to change state in response to the magnetic field from the magnet. An audible or visual signal, or both, is provided in response to the change in state of the magnetically actuated switch.

12 Claims, 8 Drawing Figures

ICE FISHING APPARATUS

BACKGROUND OF THE INVENTION

The present invention relates to ice fishing apparatus which provides a signal to the fisherman when a fish is on the line.

One popular type of ice fishing device utilizes a fish line reel which is suspended through an ice hole and below the water surface. Since the reel is out of view, a signalling device must be provided to inform the fisherman that a fish is on the line. These types of devices have often been called "tip ups". Some form of mechanical linkage is connected to the fish line and controls a flag or other signalling device which pops up or otherwise moves to indicate the presence of a fish on the line. Examples of these types of devices are shown in U.S. Pat. Nos. 2,170,000 by Eggleston, 2,581,517 by Baulski, 2,955,374 by Matzo et al, and 4,121,367 by Gonnello.

Other electrical signalling devices have been developed for indicating the occurrence of a pull on a fish line when the bait is seized by a fish. For example, U.S. Pat. No. 2,627,690 by Kniffer shows the use of a battery, and electric light, and a removable electrically non-conductable spacer which is connected to the fish line. A resilient metal bracket is mounted to one of the terminals of the battery and holds the electric lamp with its lower terminal against the other terminal of the battery. When the spacer of non-conductive material is inserted between the battery terminal and the light, the light is turned off. When the spacer is pulled from between the lamp and the battery terminal by force on the fish line, the lamp turns on. This arrangement, of course, is generally unsuitable for an ice fishing device in which the reel is located under water.

U.S. Pat. No. 2,679,036 by Vasek describes another signalling device in which either a visual or an audible signal is produced when a fish is on one of the fishing lines. This device is used with a fishing boat in which the fisherman has several fishing lines. It is not intended for use in ice fishing apparatus in which a reel is located below the ice and immersed in water.

SUMMARY OF THE INVENTION

The present invention is an ice fishing apparatus which may be used both for outside fishing, in which a reel is normally below the ice and water level, as well as for fishing inside of an ice fishing house, in which the entire apparatus, including the reel, is located above the ice. The present invention provides a signal when a sufficient force is applied to the fish line, which may be either visual, audible, or both. No complicated mechanical linkages are required, as in the prior art "tip up" fishing devices.

The ice fishing apparatus of the present invention includes a magnet and a magnetically actuated switch which are positioned in close proximity of one another. The magnetically actuated switch is capable of changing state in response to the magnetic field from the magnet. A metal tab is connected to the fish line for insertion between the magnet and the magnetically actuated switch. When in its inserted position, the metal tab shields the magnetically actuated switch from the magnetic field produced by the magnet. When a force is applied to the fish line which is sufficient to pull the tab from its inserted position between the magnetically actuated switch and the magnet, the magnetically actuated switch changes state. Signalling means are connected to the switch for providing a signal in response to the change in state of the magnetically actuated switch.

The ice fishing apparatus of the invention includes, in one embodiment, a base which carries the magnetically actuated switch, an arm which carries the magnet and which is pivotally connected to the base, and means for adjusting the clamping force between the arm and the base. In this manner, the fisherman can select the force on the fishing line required to remove the metal tab from its inserted position.

The ice fishing apparatus of the invention may be used either outdoors, or within an ice fishing house. In the outdoor embodiment, an elongated member carries the base, the arm, the magnet, and the magnetically actuated switch near its lower end. A reel is attached to the lower end, and the signalling means is located at the upper end of the device. Means are provided for supporting the elongated member so that the lower end containing the reel, the magnet, the magnetically actuated switch, the base, and the arm are submerged in water, while the signalling means are located above the ice.

In the indoor embodiment of the invention, the elongated member may be suspended from a ceiling or other location above a fish hole in the ice. A reel, which may be either attached to the elongated member or may be separate, provides the fish line to which the metal tab is connected and which extends down through the hole in the ice and into the water. In this embodiment, the entire apparatus other than the fish line is located above the ice and out of the water.

BRIEF DESCRIPTION OF THE DRAWINGS

FIG. 5 is an electrical schematic diagram of a preferred embodiment of the signalling circuitry of the present invention.

DETAILED DESCRIPTION OF THE PREFERRED EMBODIMENTS

Figures 1, 2, 3:
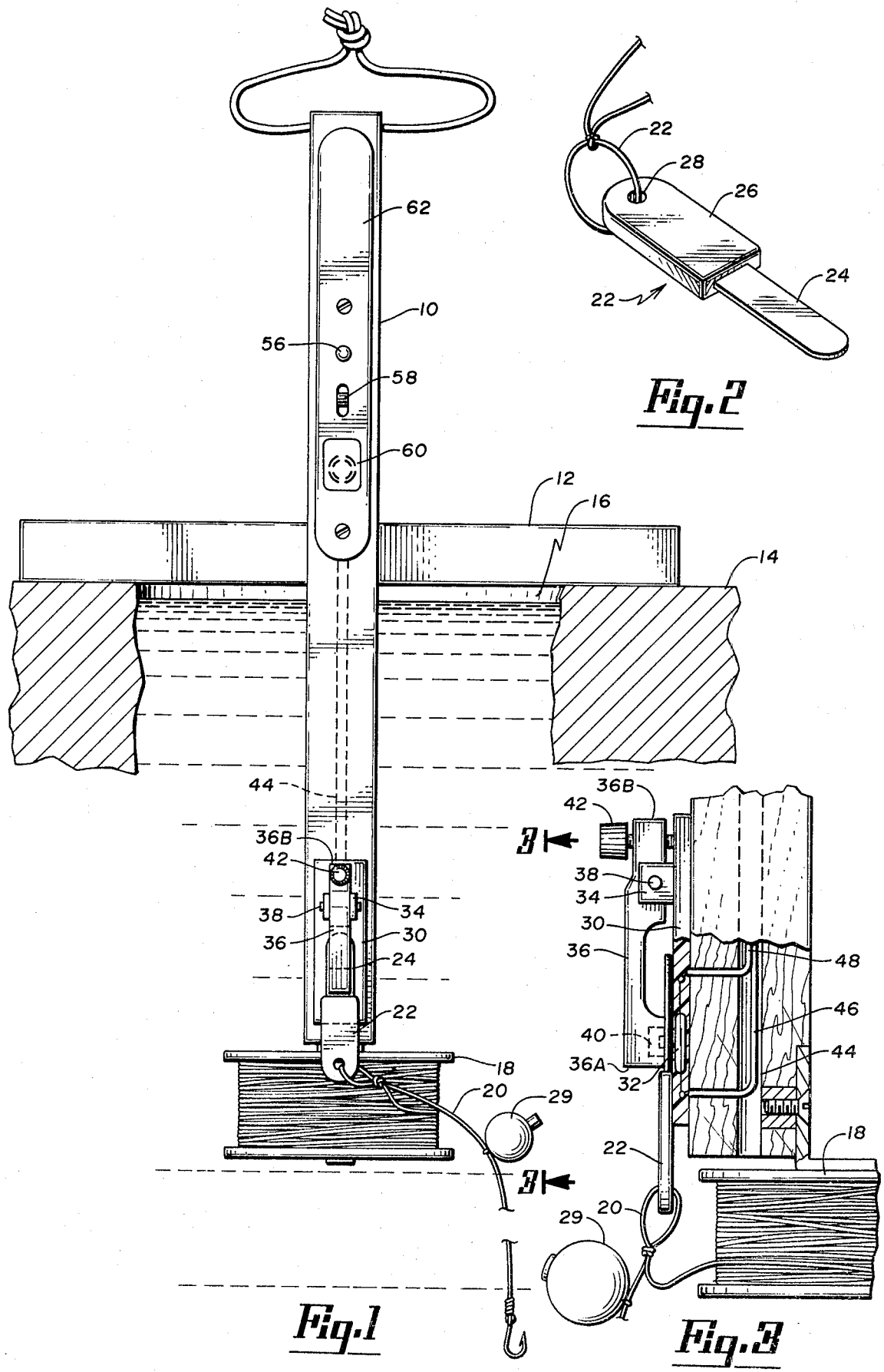
FIG. 1 shows a preferred embodiment of the ice fishing apparatus of the present invention.
FIG. 2 is a perspective view of the metal tab used in the preferred embodiment of the present invention.
FIG. 3 is a side view of the lower portion of the ice fishing apparatus of FIG. 1, with a portion broken away.

FIG. 1 shows a preferred embodiment of the ice fishing apparatus of the present invention. The apparatus includes an elongated main member 10, which may be made of wood or other suitable material. Cross bar 12 is pivotally connected to main member 10 so that the fishing apparatus will rest on ice 14 with the lower end of member 10 extending through hole 16 in ice 14.

At the lower end of member 10 is an open face reel 18, which is mounted to member 10 so that fishing line 20 may come off reel 18 without requiring reel 18 to rotate. Attached to fish line 20 near reel 18 is tab 22, which is best shown in FIG. 2. Tab 22 includes a thin metal portion 24 of a ferrous metal and a handle portion 26, which is preferably plastic, and which has a hole 28 at one end. Fishing line 20 is threaded through hole 28 or otherwise connected to tab 22.

Also attached to fishing line 20 is a small bobber 29, which is used as a counterbalance against the weight of the sinker, the hook and the minnow attached at the end of line 20. The use of bobber 29 is optional, and depends upon the weight on line 20. The counterbalance effect of bobber 29 prevents excessive removal of line 20 from open face reel 18.

As best shown in FIG. 3, base 30 is attached to the front surface of member 10 near its lower end. Embedded in base 30 is a magnetically actuated reed switch 32. In one preferred embodiment, base 30 is a molded plastic plate having a recess in its back surface in which reed switch 32 is mounted.

Base 30 also includes pivot supports 34, which project from the front surface of base 30. Pivot supports 34 pivotally support arm 36 on pivot pin 38. Arm 36 has an end portion 36a which carries a small, horseshoe shaped magnet 40 embedded therein. Magnet 40 is normally in a position in close proximity to reed switch 32.

Arm 36, which is preferably molded plastic, is loaded by compression loading screw 42 at second end 36b of arm 36. As screw 42 is adjusted, a spring load compresses first end 36a of arm 36 toward base 30. The metal portion of tab 22 is inserted between base 30 and arm 36 so that it is held in position between magnet 40 and reed switch 42. Metal tab 24 closes the flux path of horseshoe shaped magnet 40 and thereby shields reed switch 32 from the magnetic field of magnet 40 whenever tab 22 is inserted in position.

When a sufficient force is applied to line 20 to cause tab 22 to pull out from between magnet 40 and reed switch 32, reed switch 32 closes, which produces an alarm signal, as will be discussed in detail later.

Compression loading screw 42 adjusts the force which is required on line 20 in order to pull tab 22 out of its inserted position. In this way, the fisherman can, in effect, adjust the sensitivity of the ice fishing apparatus.

Use of magnet 40 and magnetically actuated reed switch 32 in the present invention is particularly advantageous for ice fishing apparatus. Due to the magnetic rather than electrical nature of the switching actuation, reed switch 32 may be encapsulated and protected from the environment. Unlike electrical switching type apparatus, the contacts are never exposed to water or environment. As a result, degradation of the contacts due to exposure to the environment is not encountered.

In addition, the magnetically actuated switching utilized in the present invention provides an extremely well-defined, reliable and repeatable switching. By use of arm 36 and adjusting screw 42, the force required to produce the magnetic switching can be varied to accommodate different fishing conditions.

In FIG. 3, lower member 10 is partially broken away to reveal cored passage 44, which runs from the lower end of member 10 up to the signalling circuitry and annunciators in the upper end of member 10. As shown in FIG. 3, wires 46 and 48 are connected to reed switch 32 and extend up through cored passage 44 to the circuitry in the upper end of member 10.

Figure 4:
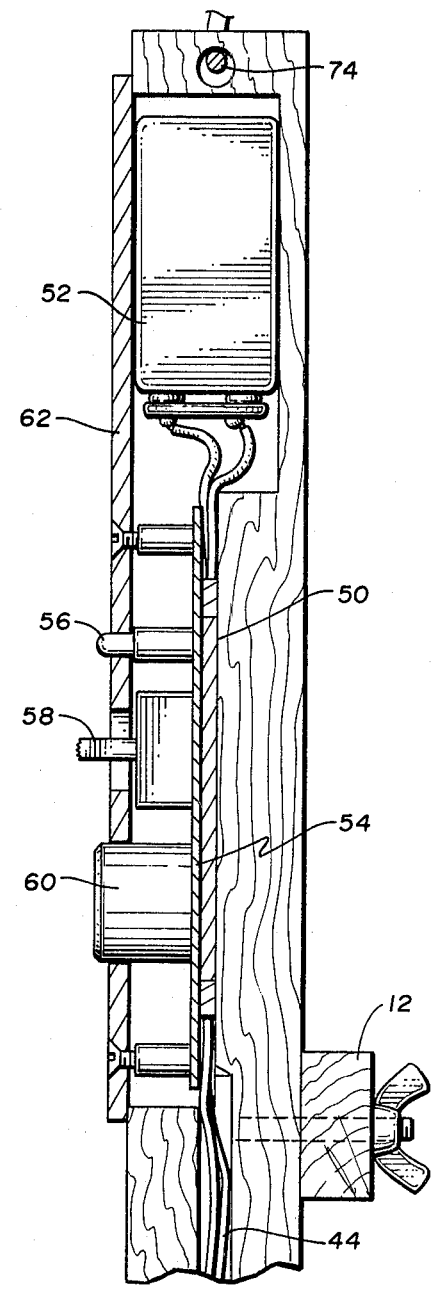
FIG. 4 is a cross-sectional side view of the upper portion of the ice fishing apparatus of FIG. 1.

FIG. 4 shows a cross-sectional side view of the upper end of member 10. Member 10 includes a recess 50 in its front surface which communicates with the cored passage 44. Mounted within recess 50 are battery 52 and a printed circuit board 54 having connected thereto light-emitting diode 56, three-position switch 58, and buzzer 60. Cover plate 62 covers recess 50 and contains apertures through which light-emitting diode 56, switch 58, and buzzer 60 project.

FIG. 5 is an electrical schematical diagram showing the signalling circuitry used in one preferred embodiment of the present invention. As shown in FIG. 5, reed switch 32 has one terminal connected to the positive terminal of battery 52. The opposite terminal of reed switch 32 is connected to a terminal of switch 58. As shown in FIG. 5, three-position switch 58 has three switching terminals 58A, 58B, and 58C. Terminal 58A is contacted when three-position switch 58 is in its center position, and causes the circuit to be turned off.

Connected in series between terminal 58B and the negative terminal of battery 52 are light-emitting diode 56 and resistor 64, which limits current flow through light-emitting diode 56. Connected between terminal 58C and the negative terminal of battery 52 is buzzer 60. Also connected between terminals 58B and 58C is diode 66, with its anode connected to terminal 58C, and its cathode is connected to terminal 58B, so as to permit current flow only in the direction from terminal 58C to terminal 58B.

When switch 58 is in a position in which terminal 58B is contacted, closure of reed switch 32 causes only light-emitting diode 58 to be actuated. Diode 66 blocks current from flowing from terminal 58B to buzzer 60.

On the other hand, when switch 58 is in a position in which terminal 58C is contacted, both buzzer 60 and light-emitting diode 56 are actuated in response to closure of reed switch 32. This is because current flow is permitted through diode 66 from terminal 58C to diode 56.

Figure 6:
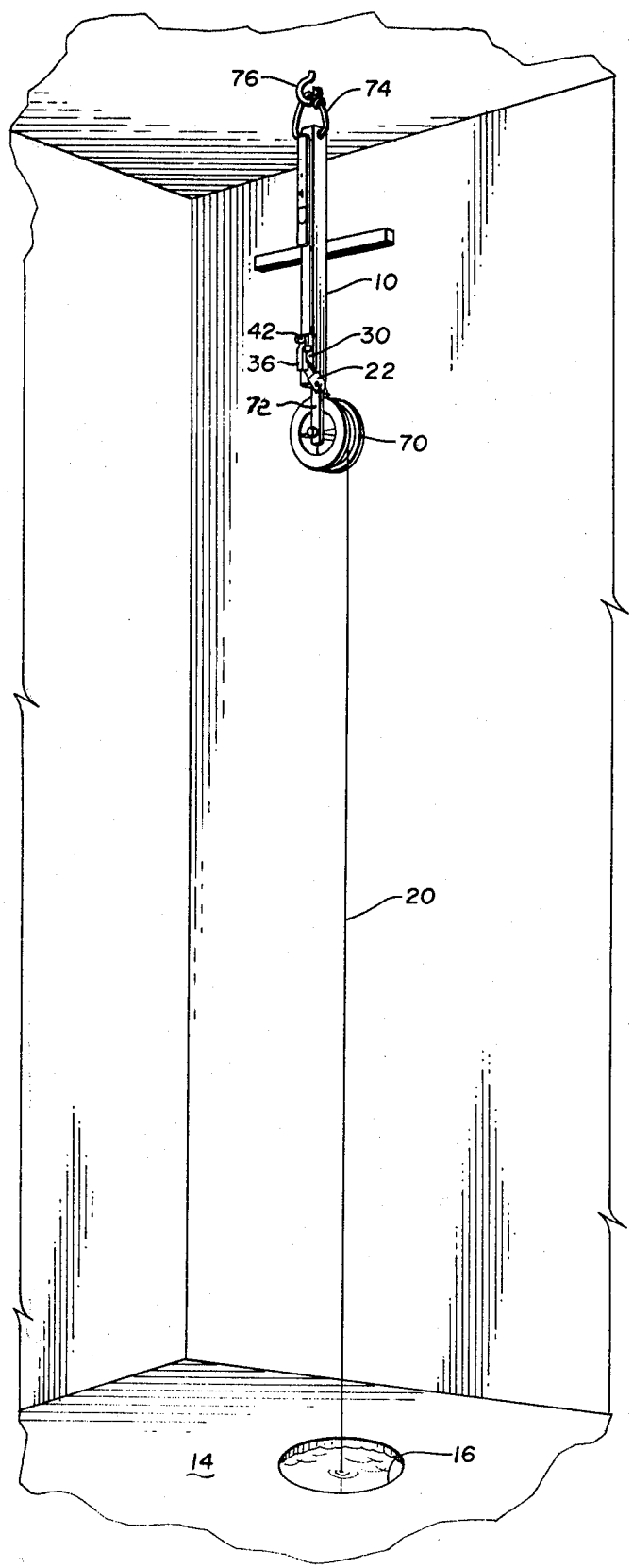
FIG. 6 is a perspective view of another embodiment of the present invention, in which the entire apparatus is suspended above the hole in the ice.

FIG. 6 shows another embodiment of the present invention which is preferably used within an ice fishing house. The ice fishing apparatus of FIG. 6 is generally similar to the apparatus shown in FIGS. 1-4, and similar numerals are used to designate similar elements. In the embodiment shown in FIG. 6, a rotating type straight line reel 70 is used in place of the open face, non-rotating reel shown in FIG. 1. Reel 70 is mounted by bracket 72 to the bottom of main member 10, and rotates as fish line 20 is fed through hole 16 in ice 14.

At the top of member 10 is a loop 74 of leather, rope, or the like. Loop 74 is held in hook 76 or other suitable means attached to the ice fishing house, so that the ice fishing apparatus is suspended above hole 16.

As in the previous embodiments, tab 22 is attached to fish line 20, and its metal portion 28 is inserted between magnet 40 in arm 36 and reed switch 32 in base 30. When a fish takes the bait on line 20 and applies sufficient force to line 20 to pull tab 22 out of its inserted position, the signalling circuitry provides a signal to the fisherman.

Although the apparatus of FIG. 6 shows reel 70 and bracket 72 attached to member 10, they may also be separate from member 10. In many cases, a fisherman already has a reel or reels in place within the ice fishing house. The apparatus of the present invention, therefore, can be used in conjunction with different reels at different times.

Figure 7:
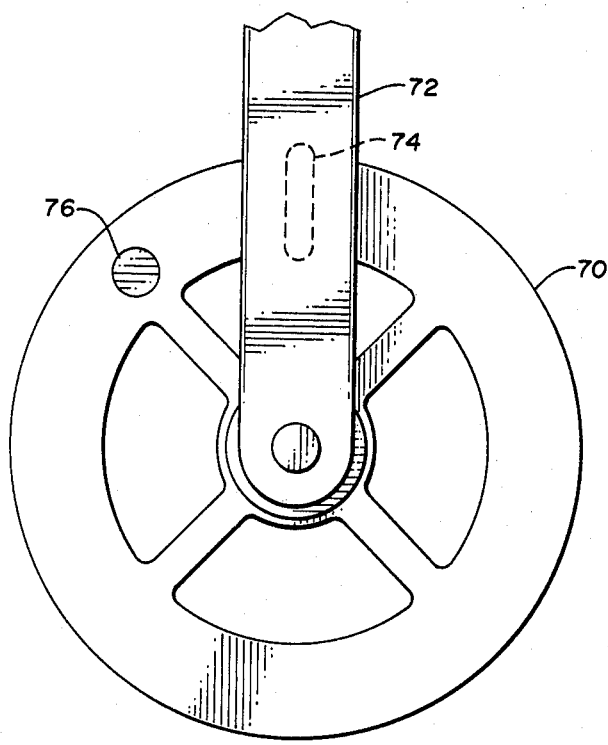
FIG. 7 is a view of the reel used in another embodiment of the present invention, in which rotation of the reel is sensed with a magnet and magnetic reed switch.
Figure 6:
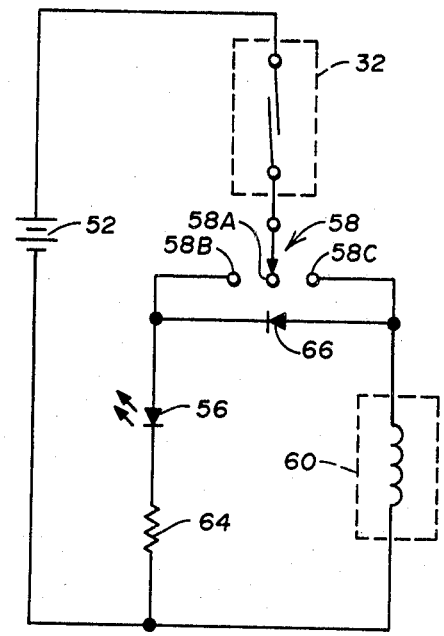
Figure 8:
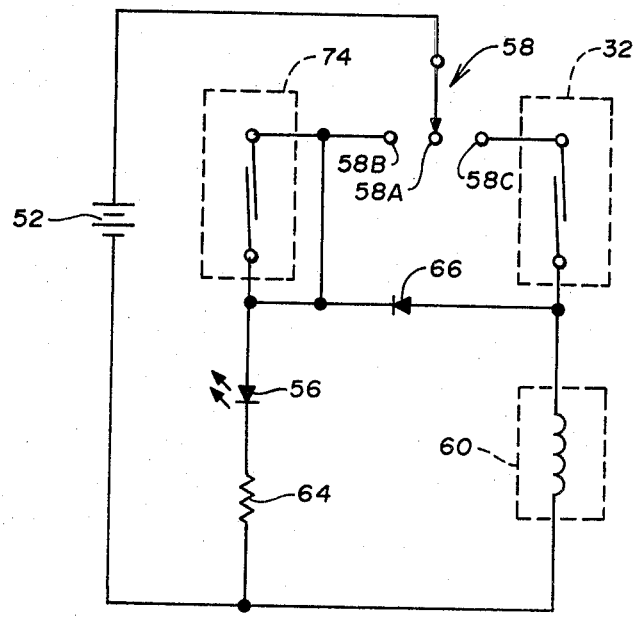
FIG. 8 is an electrical schematic diagram of the signalling circuitry used in conjunction of the embodiment of the present invention illustrated in FIG. 7.

In another preferred embodiment of the present invention illustrated in FIGS. 7 and 8, an additional magnet and reed switch are used in conjunction with the ice fishing apparatus of the type shown in FIG. 6. FIG. 7 illustrates reel 70 and bracket 72 in this embodiment.

As shown in FIG. 7, second reed switch 74 is carried on mounting bracket 72 in a position which is closely spaced to one surface of reel 70. Second magnet 76, which is preferably a cylindrical ceramic magnet having its poles at its major surfaces, is embedded in or otherwise carried by reel 70. Each time reel 70 rotates to a position at which second magnet 76 is closely spaced to second reed switch 74, the contacts of second reed switch 74 are closed. The state of the contacts of second reed switch 74, therefore, provide an indication of rotation of reel 70.

FIG. 8 shows an electrical schematic diagram of the ice fishing apparatus which utilizes second reed switch 74 and second magnet 76. As illustrated in FIG. 8, the common terminal of switch 58 is connected to the positive terminal of battery 52. Center terminal 58A of switch 58 is once again the off terminal and is unconnected. Terminal 58B is connected to one terminal of second reed switch 74. The opposite terminal of reed switch 74 is connected to the anode of light-emitting diode 56. The cathode of light-emitting diode 56 is connected through resistor 64 to the negative terminal of battery 52.

Connected between terminal 58C and the negative terminal of battery 52 are first reed switch 32 and buzzer 60. Also connected at the junction of reed switch 32 and buzzer 60 is the anode of diode 66. The cathode of diode 66 is connected to terminal 58B.

When switch 58 is in a position in which terminal 58C is contacted, closure of reed switch 32 actuates buzzer 60. In addition, it enables light-emitting diode 56 to be actuated when the contacts of second reed switch 74 are closed. In other words, the removal of tab 22 from its inserted position causes buzzer 60 to be actuated. In addition, once the contacts of reed switch 32 are closed, each time second reed switch 74 closes, light-emitting diode 56 will be actuated.

When switch 58 is in a position in which terminal 58B is contacted, only light-emitting diode 56 may be actuated. Diode 66 prevents any current flow to buzzer 60. In this position, second reed switch 74 controls solely the operation of light-emitting diode 56.

The embodiment shown in FIGS. 7 and 8 permits the fisherman to observe the play on fish line 20 after tab 22 has been pulled from its inserted position. By observing the rate at which light-emitting diode 56 flashes and the number of flashes, an experienced fisherman can make a determination of the size and type of fish on the line. As a result, the fisherman can determine when is the best moment to yank the line and set the hook.

In this embodiment, normally the fisherman will initially set switch 58 in the position (58C) in which buzzer 60 will be actuated when the contacts of first reed switch 32 are closed. Once this occurs, the operator will move switch 58 to its other operating position (58B) in which only light-emitting diode 56 is actuated when the contacts of second reed switch 74 are closed. As a result, the fisherman can continue to play the fish without the constant sound from buzzer 60.

In conclusion, the ice fishing apparatus of the present invention is a simple device which requires no complex mechanical linkages. It is usable both for outdoor ice fishing, in which the reel is submerged, as well as used within an ice fishing house, in which the entire apparatus may be located out of the water.

Although the present invention has been described with reference to preferred embodiments, workers skilled in the art will recognize that changes may be made in form and detail without departing from the spirit and scope of the invention.

What is claimed is:

1. Fishing apparatus for use with a fishing line comprising:
   a magnet for providing a magnetic field;
   a magnetically actuated switch for changing state in response to the magnetic field from the magnet, the magnetically actuated switch being positioned in close proximity to the magnet;
   a metal tab for insertion between the magnet and the magnetically actuated switch, the metal tab having means for engaging a fishing line to permit a force on the fishing line to move the metal tab in a direction tending to remove the metal tab from its inserted position between the magnet and the magnetically actuated switch, the metal tab shielding the magnetically actuated switch from the magnetic field of the magnet when the metal tab is in its inserted position between the magnet and the magnetically actuated switch, whereby when a force on the fishing line removes the metal tab from its inserted position between the magnet and the magnetically actuated switch the magnetic field causes the magnetically actuated switch to change state;
   a base for carrying the magnetically actuated switch, the base having a generally planar surface;
   an arm having first and second ends, the arm carrying the magnet proximate its first end;
   pivotal mounting means extending outward from the planar surface of the base for pivotally mounting the arm with respect to the base, the pivotal mounting means defining a pivot axis which is generally parallel to the planar surface, and wherein the arm is pivotally mounted at a position between its first and second ends to pivot about the pivot axis;
   means for providing an adjustable clamping force between the first end of the arm and the planar surface of the base comprising a compression screw threaded through the arm proximate the second end of the arm and having an end engaging the planar surface of the base for applying an adjustable force between the second end of the arm and the planar surface of the base, wherein turning the compression screw adjusts the force between the second end of the arm and the planar surface of the base to adjust thereby the clamping force between the first end of the arm and the planar surface of the base and the force on the fishing line required to remove the tab from its inserted position between the magnet and the magnetically actuated switch; and
   signalling means connected to the magnetically actuated switch for providing a signal in response to a change in state of the magnetically actuated switch.

2. The invention of claim 1 and further comprising:
   an elongated member carrying the base, the arm, and the signalling means.

3. The invention of claim 2 and further comprising:
   a reel connected to the elongated member proximate a lower end of the elongated member for providing the fishing line.

4. The invention of claim 3 and further comprising:

means connected to the elongated member for supporting the elongated member partly immersed in water.

5. The invention of claim 4 wherein the reel comprises an open faced, non-rotating reel connected to the lower end of elongated member.

6. The invention of claim 5 wherein the means connected to the elongated member supports the elongated member with the reel, the arm, the base, and the tab immersed in water.

7. The invention of claim 3 wherein the reel is a rotating type reel connected at the lower end of the elongated member.

8. The invention of claim 7 and further comprising: means for sensing rotation of the reel.

9. The invention of claim 8 wherein the signalling means further provides a signal as a function of rotation of the reel after the metal tab has been removed from its inserted position between the magnet and the magnetically actuated switch.

10. Fishing apparatus comprising:
a magnet for providing a magnetic field;
a magnetically actuated switch for changing state in response to the magnetic field from the magnet, the magnetically actuated switch being positioned in close proximity to the magnet;
a metal tab for insertion between the magnet and the magnetically actuated switch, the metal tab having means for engaging a fishing line to permit a force on the fishing line to move the metal tab in a direction tending to remove the metal tab from its inserted position between the magnet and the magnetically actuated switch, the metal tab shielding the magnetically actuated switch from the magnetic field of the magnet when the metal tab is in its inserted position between the magnet and the magnetically actuated switch, whereby when a force on the fishing line removes the metal tab from its inserted position between the magnet and the magnetically actuated switch the magnetic field causes the magnetically actuated switch to change state;
signalling means connected to the magnetically actuated switch for providing a signal in response to a change in state of the magnetically actuated switch;
a base for carrying the magnetically actuated switch, the base having a generally planar surface;
an arm having first and second ends, the arm carrying the magnet proximate its first end, and being pivotally mounted with respect to the base at a position between the first end and the second end to pivot about a pivot axis spaced from and generally parallel to the planar surface;
means for providing an adjustable clamping force between the first end of the arm and the base comprising a compression screw threaded through the arm proximate the second end of the arm and having an end engaging the planar surface of the base for applying an adjustable force between the second end of the arm and the planar surface, wherein turning the compression screw adjusts the force between the second end of the arm and the planar surface to adjust thereby the clamping force between the first end of the arm and the planar surface and the force on the fishing line required to remove the tab from its inserted position between the magnet and the magnetically actuated switch; and
an elongated member carrying the base, the arm and the signalling means.

11. The ice fishing apparatus of claim 10 wherein a reel for supplying the fishing line is connected to the elongated member proximate a lower end of the elongated member.

12. The apparatus of claim 11 and further comprising:
means connected to the elongated member for supporting the elongated member partly immersed in water, with the reel, the arm, the base, and the tab immersed in water, and the signalling means above water.

* * * * *